United States Patent
Noll

(10) Patent No.: US 7,402,635 B2
(45) Date of Patent: Jul. 22, 2008

(54) PROCESS FOR PREPARING POLYETHYLENE

(75) Inventor: Patrick Noll, Humble, TX (US)

(73) Assignee: Fina Technology, Inc., Houston, TX (US)

( * ) Notice: Subject to any disclaimer, the term of this patent is extended or adjusted under 35 U.S.C. 154(b) by 432 days.

(21) Appl. No.: 10/625,711

(22) Filed: Jul. 22, 2003

(65) Prior Publication Data

US 2005/0020784 A1 Jan. 27, 2005

(51) Int. Cl.
*C08F 2/00* (2006.01)
*G05B 21/00* (2006.01)

(52) U.S. Cl. .............................. 526/64; 526/59; 700/30; 700/31; 700/34; 700/269; 706/21; 706/906

(58) Field of Classification Search .................... 526/59, 526/60, 61, 64; 700/269, 31, 34, 30; 422/105, 422/132; 706/21, 906
See application file for complete search history.

(56) References Cited

U.S. PATENT DOCUMENTS

| | | | | |
|---|---|---|---|---|
| 3,293,000 | A | | 12/1966 | Marwil .......................... 23/285 |
| 3,636,326 | A | * | 1/1972 | Smith et al. .................. 700/269 |
| 4,121,029 | A | | 10/1978 | Irvin et al. ..................... 526/64 |
| 4,613,484 | A | * | 9/1986 | Ayres et al. .................. 422/132 |
| 5,111,531 | A | * | 5/1992 | Grayson et al. ................ 706/23 |
| 5,282,261 | A | * | 1/1994 | Skeirik .......................... 706/23 |
| 5,481,502 | A | | 1/1996 | Cretin et al. .................... 367/77 |
| 6,072,576 | A | | 6/2000 | McDonald et al. ........... 356/300 |
| 6,144,897 | A | * | 11/2000 | Selliers ........................ 700/269 |
| 6,243,696 | B1 | * | 6/2001 | Keeler et al. ................... 706/21 |
| 6,303,825 | B1 | * | 10/2001 | Gerlich et al. ............... 568/385 |
| 6,319,995 | B2 | | 11/2001 | Glenn et al. .................... 526/64 |
| 6,479,597 | B1 | | 11/2002 | Long et al. ..................... 526/59 |
| 6,566,460 | B1 | | 5/2003 | Salmon ......................... 526/64 |
| 6,718,234 | B1 | * | 4/2004 | Demoro et al. .............. 700/269 |
| 6,723,805 | B2 | * | 4/2004 | Braganca et al. .............. 526/61 |

OTHER PUBLICATIONS

What is SNNS?; http://www-ra.informatik.uni-tuebingen.de/SNNS/announce.html, etc.
Frederick Hayes-Roth; The Knowledge-Based Expert System: A Tutorial, Sep. 1984, pp. 11-28.
PC AI—Expert Systems; Expert Systems, http://pcai.com/web/ai_info/expert_systems.html, pp. 1-15.

* cited by examiner

*Primary Examiner*—Fred M Teskin
(74) *Attorney, Agent, or Firm*—Shirley A. Kopecky

(57) ABSTRACT

Disclosed is process for producing polyethylene using a slurry loop reactor. The process includes using a mathematical model to predict a plurality of process control parameters based on the desired product properties and reactor characteristics and controlling the process using the predicted process control parameters. Also disclosed is a process controller programmed with the model and a method for optimizing the configuration of a loop reactor using the model.

16 Claims, No Drawings

PROCESS FOR PREPARING POLYETHYLENE

BACKGROUND OF THE INVENTION

1. Field of the Invention

The present invention relates to a process for preparing polyethylene. The present invention particularly relates to preparing high density polyethylene using a slurry loop reactor.

2. Background of the Art

It is well known in the art of manufacturing chemicals in general and polymers in particular to use a reactor consisting of a pipe containing a flowing stream of reactants. One such pipe reactor is known as the slurry loop reactor. In a slurry loop reactor, reactants are feed into a pipe containing a solvent and a catalyst. The admixture of solvent, reactants, and catalyst are continuously recycled through the pipe, hence the term "loop," with the reaction product being continuously removed.

In the manufacture of high density polyethylene, particles of polyethylene can be removed from the reactor by means of a settling leg. U.S. Pat. No. 3,293,000 to Marwil discloses the use of settling legs in a loop reactor for manufacturing an ethylene butane copolymer. In this reference, the settling leg functions to allow a portion of the polymer slurry to escape from the loop into outlets that allow the particles to be gravimetrically removed.

While technology for preparing polymers has changed with respect to catalysts and reactants, the same general loop reactor technology employed in the 1960s is still in use. For example, U.S. Pat. No. 4,613,484 to Ayres, et al., discloses an improvement to settling legs, also referred to as accumulator legs, is disclosed. This technology is still generally current and in present use, particularly for the production high density polyethylene.

Despite loop reactors having been used for a long time, the process of starting a running a loop reactor is not without problems. U.S. Pat. No. 6,303,825 to Gerlich, et al. discloses a method of starting up a loop reactor system. This reference suggests using a microprocessor to automate starting up and running a loop reactor. One suggested algorithm recognizes the end of the startup of the reactor and then controls the reactor at steady state.

SUMMARY OF THE INVENTION

In one aspect, the present invention is a process for producing polyethylene using a slurry loop reactor comprising using a mathematical model to predict a plurality of process control parameters. The prediction is based on the desired product properties, reactor contents mass balance, and reactor characteristics. The slurry loop reactor is controlled using the predicted process control parameters.

In another aspect, the present invention is a controller programmed with such a mathematical model for use in controlling a polyethylene slurry loop reactor.

In still another aspect, the present invention is a process for optimizing the configuration of a polyethylene slurry loop reactor comprising using such a mathematical model to design the reactor.

DETAILED DESCRIPTION OF INVENTION

In one embodiment, the present invention is a process for producing polyethylene using a slurry loop reactor. The polyethylene produced can be high density polyethylene. The slurry loop reactors useful with the process of the present invention include those using settling legs to remove polymer particles from the reactor. These reactors are also sometimes referred to as Phillips Reactors and manufacturing processes using such reactors are sometimes referred to as Phillips Processes. Loop reactors not having such legs can also be used with the method of the present invention.

In the practice of the method of the present invention, a mathematical model is used. In one embodiment, this model uses mass balance of reactor contents, reactor geometry, catalyst kinetics, and settling phenomena in the outlet settling legs to determine relationships between inlet feed rates and reactor geometry on production conditions. The relationship between these can be defined using a series of equations having a plurality of variables. The variables that can be employed in a process of the present invention include:

| | |
|---|---|
| $E_i =$ | ethylene flow into reactor |
| $E_o =$ | ethylene flow out of reactor |
| $I_i =$ | isobutane flow into reactor |
| $I_o =$ | isobutane flow out of reactor |
| $H_i =$ | hexene flow into reactor |
| $H_o =$ | hexene flow out of reactor |
| $H_c =$ | hexene conversion in reactor |
| $h_i =$ | hydrogen flow into reactor |
| $h_o =$ | hydrogen flow out of reactor |
| $h_c =$ | hydrogen conversion in reactor |
| $P_o =$ | polymer flow out of reactor |
| $L_o =$ | liquid flow out of reactor |
| $T_{iw} =$ | total mass flow into reactor |
| $T_{ow} =$ | total mass flow out of reactor |
| $T_{ov} =$ | total volume flow out of reactor |
| $c_i =$ | catalyst flow into reactor |
| $c_o =$ | catalyst flow out of reactor |
| $C_E =$ | concentration of ethylene in the reactor liquid |
| $C_H =$ | concentration of hexene in the reactor liquid |
| $C_h =$ | concentration of hydrogen in the reactor liquid |
| $T =$ | temperature of reactor |
| $P =$ | pressure of reactor |
| $S_w =$ | weight concentration of solids in the reactor slurry |
| $S_v =$ | volume concentration of solids in the reactor slurry |
| $S_{ws} =$ | weight concentration of solids in the settling leg solids bed |
| $N_l =$ | number of settling legs |
| $V =$ | reactor volume |
| $d_l =$ | settling leg diameter |
| $h_l =$ | settling leg height |
| $r_b =$ | bulk density of reactor polymer |
| $r_p =$ | density of reactor polymer |
| $r_l =$ | density of reactor liquid |
| $r_s =$ | density of reactor slurry |
| $t_s =$ | residence time of reactor solids |
| $k =$ | catalyst activity |
| $p =$ | catalyst productivity |
| $d_c =$ | catalyst diameter |
| $f_c =$ | catalyst feed factor |
| $k_c =$ | catalyst activity factor |
| $v_t =$ | terminal velocity of settling polymer |
| $P_s =$ | polymer settling rate |
| $P_n =$ | rate of polymer leaving reactor that is not part of the settling leg solids bed |
| $T_s =$ | rate of slurry leaving reactor that is part of the settling leg solids bed |
| $T_n =$ | rate of slurry leaving reactor that is not part of the settling leg solids bed |
| $m_l =$ | viscosity of reactor liquid |
| $r_c =$ | density of catalyst |
| $d_p =$ | polymer diameter |
| $N_{Ar} =$ | Archimedes number for polymer settling in settling leg |
| $N_{Re} =$ | Reynolds number for polymer settling in settling leg |
| $g =$ | acceleration due to gravity |
| $A_{lp} =$ | cross sectional area of a settling leg occupied by polymer |
| $A_l =$ | cross sectional area of a settling leg |

The mathematical model of the present invention is developed based upon these variables. For example, a given slurry loop reactor can have the following known values:

| | |
|---|---|
| $P_o =$ | 58034 lb/h |
| $L_o =$ | 52966 lb/h |
| $C_E =$ | 5.0537 wt % |
| $C_H =$ | 0.54695 wt % |
| $C_h =$ | 0.0075519 wt % |
| $H_c =$ | 71.03% |
| $H_c =$ | 50% |
| $T =$ | 210 F. = 98.9 C. |
| $P =$ | 600 psig = 41.8 atm |
| $S_w =$ | 37.668 wt % |
| $V =$ | 100 m$^3$ |
| $d_l =$ | 10 in |
| $h_l =$ | 15 ft |
| $r_b =$ | 0.45 g/cc |
| $r_p =$ | 0.89 g/cc |
| $p =$ | 1624.9 lb HDPE/lb cat |
| $d_c =$ | 100 m |
| $r_c =$ | 2.2 g/cc |
| $g =$ | 9.80 m/s$^2$ |

Relationships between the variables can be calculated as follows. Assuming mass balance around the reactor, $$T_{iw} - (L_o + P_o) = 0$$

$$T_{iw} = L_o + P_o = 52966 \text{ lb/h} + 58034 \text{ lb/h} = 111000 \text{ lb/h}$$

The component mass flows in the outlet liquid can be calculated based on known outlet concentrations. Hydrogen flow is negligible portion of total liquid flow.

$$E_0 = \frac{L_o C_E}{100} = \frac{(52966 \text{ lb/h})(5.0537)}{100} = 2677 \text{ lb/h}$$

$$H_o = \frac{L_o C_H}{100} = \frac{(52966 \text{ lb/h})(0.54695)}{100} = 290 \text{ lb/h}$$

$$h_o = \frac{L_o C_h}{100} = \frac{(52966 \text{ lb/h})(0.0075519)}{100} = 4 \text{ lb/h}$$

$$I_o + E_o + H_o = L_o$$

$$I_o = L_o - E_o - H_o$$
$$= 52966 \text{ lb/h} - 2677 \text{ lb/h} - 290 \text{ lb/h}$$
$$= 50000 \text{ lb/h}$$

Assuming mass balance of isobutane around the reactor, $$I_i - I_o = 0$$

$$I_i = I_o = 50000 \text{ lb/h}$$

Assuming constant conversion of hexene and hydrogen into polymer across the intended operating region, the hexene and hydrogen feeds into the reactor can be calculated:

$$H_o = \frac{H_i(100 - C_H)}{100}$$

$$H_i = \frac{100 H_o}{100 - C_H} = \frac{(100)(290 \text{ lb/h})}{100 - 71.03} = 1000 \text{ lb/h}$$

$$h_o = \frac{h_i(100 - C_h)}{100}$$

$$h_i = \frac{100 h_o}{100 - C_h} = \frac{(100)(4 \text{ lb/h})}{100 - 50} = 8 \text{ lb/h}$$

Assuming that HDPE was produced from only the monomers ethylene and hexene, the ethylene feed into the reactor can be calculated from mass balance of ethylene around the reactor.

$$E_i - \{E_o + [P_o - (H_i - H_o)]\} = 0$$

$$E_i = E_o + [P_o - (H_i - H_o)] = 2677 \text{ lb/h} + [58034 \text{ lb/h} - (1000 \text{ lb/h} - 290 \text{ lb/h})] = 60000 \text{ lb/h}$$

Using the catalyst productivity and catalyst mass balance around the reactor, the catalyst feed to the reactor can be calculated.

$$p = \frac{P_o}{c_o}$$

$$c_o = \frac{P_o}{p} = \frac{58034 \text{ lb/h}}{1624.9 \text{ lb/lb}} = 35.715 \text{ lb/h}$$

$$c_i - c_o = 0$$

$$c_i = c_o = 35.715 \text{ lb/h}$$

An empirical correlation of isobutane liquid density, developed by Lewalle can be use with the process of the present invention. This correlation expresses liquid density (g/cc) as a function of liquid compositions (wt %), temperature (C), and pressure (atm) in the reactor:

$$\rho_l = 0.5767 + 2.273e-04P -$$
$$C_E \begin{pmatrix} 3.991e-04 + 1.126e-04P - \\ 2.496e-06P^2 + 1.679e-08P^3 \end{pmatrix} -$$
$$C_E^2 \begin{pmatrix} 4.943e-06 + 5.33e-06P - \\ 1.714e-07P^2 + 1.307e-09P^3 \end{pmatrix} -$$
$$T(7.718e-04 + 2.362e-06P) -$$
$$TC_E \begin{pmatrix} 7.146e-05 - 5.734e-06P + \\ 1.254e-07P^2 - 8.388e-10P^2 \end{pmatrix} -$$
$$TC_E^2 \begin{pmatrix} 8.449e-07 - 3.265e-07P + \\ 9.876e-09P^2 - 7.522e-11P^2 \end{pmatrix} -$$
$$T^2(7.646e-06 - 6.735e-08P) +$$
$$T^2 C_E \begin{pmatrix} 3.932e-07 - 5.549e-08P + \\ 1.269e-09P^2 - 8.579e-12P^3 \end{pmatrix} +$$
$$T^2 C_E^2 \begin{pmatrix} 1.435e-08 - 4.099e-09P + \\ 1.197e-10P^2 - 9.003e-13P^3 \end{pmatrix} +$$
$$0.001 C_H \left[ 0.001 + \left(1 - \frac{P-15}{5C_E + 60}\right) \right] \left(\frac{T}{100}\right)^{2.5\frac{C_E}{8}}$$

The liquid density, upon substitution of variables, simplifies to $$\rho_l = 0.431 \text{ g/cc}$$

Using the calculated liquid density, the assumed polymer density, and the solids concentration, the slurry density can be calculated:

$$\rho_s = \frac{100 \rho_p \rho_l}{100 \rho_p + S_w(\rho_l - \rho_p)} = \frac{(100)(0.89 \text{ g/cc})(0.431 \text{ g/cc})}{(100)(0.89 \text{ g/cc}) + (37.668)(0.431 \text{ g/cc} - 0.89 \text{ g/cc})}$$

$$\rho_s = 0.535 \text{ g/cc}$$

The volumetric flow rate of slurry out of the reactor can be calculated from the mass flow rate and density of each component:

$$T_{ov} = \frac{P_o}{\rho_p} + \frac{L_o}{\rho_l}$$

$$= \left(\frac{58034 \text{ lb/h}}{0.89 \text{ g/cc}} + \frac{52966 \text{ lb/h}}{0.431 \text{ g/cc}}\right)\left(\frac{453.6 \text{ g}}{\text{lb}}\right)\left(\frac{\text{gal}}{3785 \text{ cc}}\right)\left(\frac{\text{h}}{60 \text{ min}}\right)$$

$$= 376 \text{ gpm}$$

The volumetric solids concentration in the reactor is:

$$S_v = \frac{100}{1 + \frac{\rho_p}{\rho_l}\left(\frac{100}{S_w} - 1\right)}$$

$$= \frac{100}{1 + \left(\frac{0.89 \text{ g/cc}}{0.431 \text{ g/cc}}\right)\left(\frac{100}{37.67} - 1\right)}$$

$$= 22.64 \text{ vol\%}$$

The solid residence time is calculated as follows:

$$\tau_s = \frac{V\rho_s S_W}{100 P_O}$$

$$= \frac{(100 \text{ m}^3)(0.535 \text{ g/cc})(37.668)}{(100)(58034 \text{ lb/h})} \cdot \frac{1e06 \text{ cc}}{\text{m}^3} \cdot \frac{\text{lb}}{453.6 \text{ g}} \cdot \frac{60 \text{ min}}{\text{h}}$$

$$= 45.9 \text{ min}$$

Assuming HDPE production kinetics as being first-order for ethylene concentration in the liquid and catalyst flow rate, the kinetic rate can be expressed as:

$$P_o = k c_o C_E \tau_S$$

Substituting the catalyst productivity and rearranging the kinetic rate equation, the catalyst activity is calculated as follows:

$$p = \frac{P_o}{c_o}$$

$$k = \frac{p}{\tau_s C_E} = \frac{1624.9 \text{ lb/lb}}{(45.9 \text{ min})(5.0537 \text{ wt \%})} = 7.00 \text{ lb/lb/min/wt \%}$$

The catalyst feed factor is a function of other measured reactor variables that makes it independent of catalyst type or catalyst activity. It is expressed as:

$$f_c = k c_i$$

Using mass balance of catalyst around the reactor and rearranging the kinetic rate equation yields the following equation for catalyst feed factor:

$$f_c = k c_i$$

$$= k c_o$$

$$= \frac{P_o}{\tau_s C_E}$$

$$= \frac{58034 \text{ lb/h}}{(45.9 \text{ min})(5.0537 \text{ wt\%})}$$

$$= 250 \text{ lb/h/min/wt\%}$$

The catalyst activity factor quantifies the reactivity of the specific catalyst with respect to its size. It is expressed as:

$$k_c = \frac{k}{d_c^3}$$

$$= \frac{7.00 \text{ lb/lb/min/wt\%}}{(100\mu)^3} \cdot \frac{1e06 \text{ lb}}{1 \text{ MMlb}}$$

$$= 7.00 \text{ lb/MMlb/min/wt\%}/\mu^3$$

The slurry leaving the settling leg consists of two portions: the settled bed of polymer and liquid in the bottom of the settling leg, which is a larger concentration of solids than the reactor, and the polymer and liquid above this bed, which is the same concentration of solids as in the reactor. The concentration of polymer in the settling bed solids bed is a function of the polymer and liquid densities as well as the polymer bulk density and is calculated as follows:

$$S_{ws} = \frac{100}{1 + \rho_l\left(\frac{1}{\rho_b} - \frac{1}{\rho_p}\right)}$$

$$= \frac{100 \text{ wt\%}}{1 + (0.431 \text{ g/cc})\left(\frac{1}{0.45 \text{ g/cc}} - \frac{1}{0.89 \text{ g/cc}}\right)}$$

$$= 67.9 \text{ wt\%}$$

A mass balance of the two portions of the outlet slurry is:

$$T_{ow} = T_s + T_n$$

A mass balance of the two portions of polymer leaving in the outlet slurry is:

$$P_o = P_s + P_n$$

Using the known polymer concentrations of these two portions and solving the set of simultaneous equations, the amount of polymer leaving the settling leg from the settled bed of polymer can be calculated. This flow rate also indicates the polymer settling rate in the settling leg:

$$T_s = \frac{100 P_s}{S_{ws}}$$

$$T_n = \frac{100 P_n}{S_w}$$

$$T_{ow} = \frac{100 P_s}{S_{ws}} + \frac{100 P_n}{S_w}$$

$$T_{ow} = \frac{100 P_s}{S_{ws}} + \frac{100(P_o - P_s)}{S_w}$$

$$P_s = \frac{\frac{T_{ow}}{100} - \frac{P_o}{S_w}}{\frac{1}{S_{ws}} - \frac{1}{S_w}} = \frac{\frac{111000 \text{ lb/h}}{100} - \frac{58034 \text{ lb/h}}{37.7}}{\frac{1}{67.9} - \frac{1}{37.7}} = 36460 \text{ lb/h}$$

The viscosity of isobutane liquid as a function of temperature is:

$$\mu_l(cP) = e^{-7.3891 + \frac{2582.6}{172.23 + T(K)}}$$

$$= e^{-7.3891 + \frac{2582.6}{172.23 + 98.9 + 273.15}}$$

$$= 0.0711 \text{ cP}$$

An equation offered by Mignon to describe the relation between the size of the growing polymer particle, the catalyst particle size, and the catalyst productivity can be used with present invention. The polymer diameter is expressed as:

$$d_p = 0.42 d_c \left(\frac{\rho_c p}{\rho_p}\right)^{1/3}$$

$$= (0.42)(100 \, \mu)\left[\frac{(2.2 \text{ g/cc})(1625)}{0.89 \text{ g/cc}}\right]^{1/3}$$

$$= 666 \, \mu$$

Assuming the polymer settling in the settling leg to be steady-state and the polymer-particles are close to spheres, the settling rate can be described by the following equations. The Archimedes number for the polymer settling through the isobutane liquid is:

$$N_{Ar} = \frac{d^3 \rho_l g (\rho_p - \rho_l)}{\mu_l^2}$$

$$N_{Ar} = \frac{(666 \, \mu)^3 (0.431 \text{ g/cc})(9.80 \text{ m/s}^2)(0.89 \text{ g/cc} - 0.431 \text{ g/cc})}{(0.0711 \text{ cP})^2} \cdot$$

$$\left(\frac{cP}{g/m/s}\right)^2 \cdot \left(\frac{1 \text{ m}}{1e06 \, \mu}\right)^3 \cdot \left(\frac{100 \text{ cm}}{1 \text{ m}}\right)^6$$

$$N_{Ar} = 1.13e05$$

An equation by Dallavalle expresses the drag coefficient for this type of flow up to Reynolds number of $2e^{05}$. This equation can be used to calculate the Reynolds number from the Archimedes number:

$$N_{Re} = \left(\sqrt{14.42 + 1.827\sqrt{N_{Ar}}} - 3.798\right)^2$$

$$= \left(\sqrt{14.42 + 1.827\sqrt{1.13e05}} - 3.798\right)^2$$

$$N_{Re} = 453$$

The Reynolds number confirms that the above equation is valid for this flow regime. The velocity of the settling polymer can now be calculated using the Reynolds number:

$$N_{Re} = \frac{d_p v_t \rho_l}{\mu_l}$$

$$v_t = \frac{N_{Re} \mu_l}{d_p \rho_l}$$

$$= \frac{(453)(0.0711 \text{ cP})}{(666 \, \mu)(0.431 \text{ g/cc})} \cdot \frac{g/m/s}{cP} \cdot \frac{1e06 \, \mu}{m} \cdot \left(\frac{m}{100 \text{ cm}}\right)^3 \cdot \frac{3.28 \text{ ft}}{m}$$

$$= 0.369 \text{ ft/s}$$

The expression relating the mass flow of settling solids to the velocity of those solids is:

$$P_s = N_l A_{lp} v_t \rho_p$$

The area of the settling leg occupied by polymer is:

$$A_{lp} = \frac{A_l S_v}{100} = \frac{\pi}{400} d_l^2 S_v$$

Substituting this area into the mass flow of settling solids equation yields:

$$P_s = \frac{\pi}{400} N_l d_l^2 S_v v_t \rho_p$$

Rearranging this equation, the number of settling legs required for this reactor geometry and these production conditions is:

$$N_l = \frac{400 P_s}{\pi d_l^2 S_v v_t \rho_p}$$

$$N_l = \frac{(400)(36460 \text{ lb/h})}{\pi (10 \text{ in})^2 (22.6)(0.369 \text{ ft/s})(0.89 \text{ g/cc})} \cdot$$

$$\frac{453.6 \text{ g}}{lb} \cdot \frac{h}{3600 \text{ s}} \cdot \frac{ft}{12 \text{ in}} \cdot \left(\frac{in}{2.54 \text{ cm}}\right)^3 = 4$$

In the practice of the process of the present invention, these equations can be used to solve for numerous combinations of knowns and unknowns. For example, if the number of settling legs is known, then the diameter of the settling legs can be calculated. This is a simple calculation using the same sequence of equations as above.

For other variables, the equations above may be used in alternative sequences. An unknown variable, for example the ethylene concentration in the liquid, must first have an estimated value and then the sequence used in an iterative fashion until the ethylene concentration converges on a solution that satisfies all the equations. This type of calculation can be performed using the equations detailed above with an automated spreadsheet.

In one embodiment, the present invention is a controller for an industrial high density polyethylene slurry loop reactor. While the present invention can be used in manual or spreadsheet form, it can also be incorporated into the logic circuits of a controller. In one embodiment, the controller is a neural net or other artificial intelligence (AI) controller. When using the model of the present invention with a spreadsheet, it can be desirable to incorporate additional functionality into the spreadsheet using, for example, VISUAL BASIC®, or some other compatible computer program. It is also within the scope of the present invention that the model be incorporated into a computer program such as Fortran or C++.

Many operations in a chemical process are routinely controlled using a Proportional Integral Derivative (PID) controller. These controllers, while very useful in a conventional setting, are not preferred for the present invention. Such controllers are designed and used to monitor a single process variable and perform their control function based upon that single variable. In an embodiment of the present invention, many PID controllers, are used in conjunction with a second controller that can receive data from the PID controller and then reprogram the PID controller based upon the total inputs from the reactor sensors and controllers.

In another embodiment, the present invention is implement using an AI controller capable of accepting multiple inputs and sending multiple outputs. Preferably, the controller is a neural network model based controller. For example, one such controller is a controller using Process Perfecter® software developed by Pavilion Technologies.

While the automated controllers can be desirable for their quick response, in effect controlling the reactor in real time, the use of the present invention manually, should not be discounted. When incorporated into a spreadsheet, the process of the present invention for controlling a reactor can be very useful, particularly when changing polymer grades or production rates. In either case, the process of the present invention can be used to optimize and control a loop reactor to produce polyethylene with desirable properties. In an alternative embodiment, the model can also be used to design a loop reactor such that settler size, cycle time, reactor volume and energy consumption can all be optimized.

While the primary subject of this application is directed to the production of polyethylene, it is well known that loop reactors can be used to produce other types of polymers. For example, polypropylene can also be produced using the method of the present invention and is within the scope of the present invention. Any polymer that can be produced using a loop reactor can be produced using the method of the present invention.

EXAMPLES

The following examples are provided to illustrate the present invention. The examples are not intended to limit the scope of the present invention and should not be so interpreted. Amounts are in weight parts or weight percentages unless otherwise indicated.

Example 1

The mathematical model described above is placed into a spreadsheet and automated to allow for quick calculation of solutions. The intended operating range of the reactor is used to form the ranges of the known variables. Within these ranges, the variables are randomized and the spreadsheet used to calculate solutions to several different combinations of production conditions. These results are placed into a large dataset and fed into the control software for the building of a neural network control model. The resulting neural network control model then possesses all of the inherent relationships between variables of the original equation-based model.

The accuracy of the equation-based model is proven when the control model is placed online for closed loop control of key reactor compositions and rates ethylene concentration, percent solids, hexene concentration, hydrogen concentration, hexene/ethylene concentration ratio, hydrogen/ethylene concentration ratio and production rate. With the model-built controller, the variability of these control variables is decreased by 70% in comparison to conventional PID controllers replaced by the controller of the present invention.

The robustness of the model is demonstrated by the ability of the controller to perform successfully at from about full reactor capacity down to about half capacity and across a large range of compositions. The generic nature of the model with respect to catalyst using catalyst feed factor and catalyst activity factor to describe catalyst instead of catalyst feed flow, catalyst activity, and catalyst size is been shown by its ability to be used for Chromium, Ziegler-Natta, and Metallocene catalysts successfully with the same controller.

Example 2

A loop reactor is modeled according to the method shown above, with relationships established between the variables. Assumptions are made and then confirmed upon experimental observation. A computer spreadsheet is programmed with the model. The interface for this model is displayed in APPENDIX A as the RX Model. The formulas are displayed in APPENDIX B.

Example 3

A computer spread sheet is programmed as in Example 2 except that it is set up to allow for the input of feeds to the reactor to calculate the outlet flow rates and compositions. The interface for this model is displayed in the APPENDIX A as the RX Model Iterative. The formulas are displayed in APPENDIX C.

Rx Model

APPENDIX A

Loop Reactor Worksheet

Feeds to Loop

| | | |
|---|---|---|
| Cat feed factor = | 250.003 | |
| Cat activity factor = | 7 | |
| Catalyst/ethylene = | 0.59525 | lb/Mlb |
| Hexene/ethylene = | 16.6667 | lb/Mlb |
| Hexene = | 1000 | lb/h |
| Catalyst = | 35.7147 | lb/h |
| Total ethylene = | 60000 | lb/h |
| Isobutane/ethylene = | 0.83333 | ratio |
| Total isobutane = | 50000 | lb/h |

Flash Tank

| | | |
|---|---|---|
| % Hex/%Eth | 0.03608 | mol/mol |
| % Ethylene = | 5.05372 | wt% |
| % Hexene = | 0.54695 | wt% |
| Total Feed = | 111000 | lb/h |
| Liquid (Vapor) = | 52966.5 | lb/h |
| Isobutane = | 50000 | lb/h |
| Ethylene = | 2677 | lb/h |
| Hexene = | 290 | lb/h |
| PE = | 58033.5 | lb/h |

Inside Loop

| | | |
|---|---|---|
| % Eth in loop = | 5.05 | wt% in liq |
| PE (Heat Bal) = | 58034 | lb/h |
| Temp = | 210 | F |
| Press = | 600 | psig |
| % Solids = | 37.6681.0514 | wt% |
| $t_{cycle}$ = | 30 | s |
| # of Settling Legs = | 4 | |
| Loop Volume = | 100 | m³ |
| Settling Leg Diam. = | 10 | inches |
| Settling Leg Height = | 15 | ft |
| $r_{PE}$ = | 0.89 | g/cc |
| $BD_{PE}$ = | 0.45 | g/cc |
| Catalyst Productivity = | 1624.917924 | lb PE/lb cat |
| Temp = | 98.9 | C |
| Press = | 41.8 | atm |
| $r_{slurry}$ = | 0.535 | g/cc |
| % Solids = | 22.6 | vol% |
| % C6 = | 0.55 | wt% in liq |
| Solids R.T. = | 45.9 | min |
| Liquid R.T. = | 83.3 | min |
| k (catalyst activity) = | 7.0 | lb PE/lb cat/min/% Eth. |
| $r_{liq}$ = | 0.431 | g/cc |
| Settling Solids = | 36460 | lb/h |
| PE from legs = | 58034 | lb/h |
| PE from loop = | 0 | lb/h |
| Total out = | 376 | gpm |

Instructions

Make changes to blue text.
May change.
DO NOT make changes to red text.

*Click material balance button.*
■ = Calculated but should be input to control model

Rx Model Iterative

Loop Reactor Worksheet

Feeds to Loop

| | | |
|---|---|---|
| Cat feed factor = | 250 | lbPE/h/min/%eth |
| Cat activity factor = | 7 | (micron)^3*lbPE/MMlbcat/%eth/min |
| Catalyst/ethylene = | 0.5952381 | lb/Mlb |
| Hexene/ethylene = | 16.666667 | lb/Mlb |
| Catalyst = | 35.714286 | lb/h |
| Total ethylene = | 60000 | lb/h |
| Isobutane/ethylene = | 0.8333333 | ratio |
| Total Isobutane = | 50000 | lb/h |

Flash Tank

| | | |
|---|---|---|
| % Hex/%Eth = | 0.03608 | mol/mol |
| % Ethylene = | 5.05 | wt% |
| % Hexene = | 0.55 | wt% |
| Total Feed = | 111000 | lb/h |
| Liquid (Vapor) = | 52966 | lb/h |
| Isobutane = | 50000 | lb/h |
| Ethylene = | 2677 | lb/h |
| Hexene = | 290 | lb/h |
| PE = | 58034 | lb/h |

| | | |
|---|---|---|
| PE Balance = | 1 | lb/h |
| Hexene Bal = | 0 | lb/h |
| Settling Solids Bal = | 0 | lb/h |

Inside Loop

| | | |
|---|---|---|
| % Eth in loop = | 5.05 | wt% in liq |
| PE (Heat Bal) = | 58033 | lb/h |
| Temp = | 210 | F |
| Press = | 600 | psig |
| % Solids = | 57.67 | wt% |
| $t_{cycle}$ = | 30 | s |
| # of Settling Legs = | 6 | |
| Loop Volume = | 100 | m³ |
| Settling Leg Diam. = | 10 | inches |
| Settling Leg Height = | 15 | ft |
| $r_{PE}$ = | 0.89 | g/cc |
| $BD_{PE}$ = | 0.45 | g/cc |
| Catalyst Productivity = | 1625 | lb PE/lb cat |
| Temp = | 98.9 | C |
| Press = | 41.8 | atm |
| $r_{slurry}$ = | 0.535 | g/cc |
| % Solids = | 22.6 | vol% |
| % C6 = | 0.55 | wt% in liq |
| Solids R.T. = | 45.9 | min |
| Liquid R.T. = | 83.3 | min |
| k (catalyst activity) = | 7.0 | lb PE/lb cat/min/% Eth. |
| $r_{liq}$ = | 0.431 | g/cc |
| Settling Solids = | 36460 | lb/h |
| PE from legs = | 58033 | lb/h |
| PE from loop = | 0 | lb/h |
| Total out = | 376 | gpm |

Hydrogen

| | | |
|---|---|---|
| Hydrogen Feed = | 8.00 | lb/h |
| Hydrogen Out = | 4.00 | lb/h |
| % Hydrogen = | 0.0076 | wt% |
| %Hydrogen = | 0.2195 | mol% |
| % Hy/% Eth = | 0.0210 | mol/mol |

Instructions

Make changes to blue text (including catalyst below). May change.
DO NOT make changes to red text.

*Click material balance button.*

■ = In Material Balance
■ = Out of Material Balance

APPENDIX B

Feeds to Loop

| | | |
|---|---|---|
| Cat feed factor = | =C23/C5/C23 | |
| Cat activity factor = | =C27/100000002 | |
| Catalyst/ethylene = | =C10/C11/1000 | lb/Mlb |
| Hexene/ethylene = | =C9/C11/1000 | lb/Mlb |
| Hexene = | =C23*C9/C7 | lb/h |
| Catalyst = | =C24/C17 | lb/h |
| Total ethylene = | =C23*(C5+C13) | lb/h |
| Isobutane/ethylene = | =C13/C11 | ratio |
| Total isobutane = | =C23 | lb/h |

Flash Tank

| | | |
|---|---|---|
| % Hex/%Eth = | =C18/C17/3 | mol/mol |
| % Ethylene = | =C6*(7/23)/(26/17) | wt% |
| % Hexene = | =C4*6497/10124 | wt% |
| Total Feed = | =C20+C24 | lb/h |
| Liquid (Vapor) = | =C66/C7/C24/100 | lb/h |
| Ethylene = | =C20*C17/100 | lb/h |
| Hexene = | =C20*C18/100 | lb/h |
| PE = | =C4355/24?35 | lb/h |

Inside Loop

| | | |
|---|---|---|
| % Eth in loop = | =C17 | wt% in liq |
| PE (Heat Bal) = | =C24 | lb/h |
| Temp = | 210 | F |
| Press = | 600 | psig |
| % Solids = | =(7.56H6513+2567 | wt% |
| $t_{spa}$ = | =G11/8*1350/G30 | s |
| # of Settling Legs = | =C19*100+G20*(G16+0.G) | |
| Loop Volume = | 100 | m³ |
| Settling Leg Diam. = | 10 | inches |
| Settling Leg Height = | 15 | ft |
| $r_{rs}$ = | 0.89 | g/cc |
| $BD_{PE}$ = | 0.45 | g/cc |
| Catalyst Productivity = | =(24*12-20/(7.83) | lb PE/lb cat |
| Temp = | =(G7-32)*5.9 | C |
| Press = | =(G8+14.69595)*0.06804596 | atm |
| $r_{cat}$ = | =100*G15*G26/(100*G15+G9*G2/g/cc |
| % Solids = | =G9/Reactor/G15/(G9/Reactor/G9*vol% |
| % C6 = | =C18 | wt% in liq |
| Solids R.T. = | =G12*G20*G9/100*1000/44*min |
| Liquid R.T. = | =G12*G20*(100-G9)/100*1000/1 min |
| k (catalyst activity) = | =G17/G23/G5 | |
| $r_{rs}$ = | =0.5767+0.0902273*G19-0.5*(0.f g/cc |
| Setting Solids = | =(C19-100/G9*C24)/(C316*(1-.631 lb/h |
| PE from legs = | ='Sett Leg (calcs)'IB16*G11/G10*lb/h |
| PE from loop = | ='Sett Leg (calcs)'IB15*G11/G10*lb/h |
| Total out = | =C24*453.6/G15/3785.4/60+C20* gpm |

Catalyst Kinetic Data

| | A | B | C | D | E |
|---|---|---|---|---|---|
| | Cat. Act. = | =ReactorIG25 | lb/lb/min/%eth | =ReactorIC5 | lbPE/h/%eth/minRT |
| | | | | =ReactorIC6 | lbPE/MMlbcat/min/%et |

Settling Leg Effects

| # | A | B | C | E | F |
|---|---|---|---|---|---|
| 3 | $V_t =$ (Mass balance) | =B4/Reactor!G11/PI()*4/Reactor!G21 | ft/s | $f_{cat} =$ | 2.2 |
| 4 | Settling Solids = (Mass balance) | =Reactor!G27 | lb/h | | |
| 5 | Initial leg solids = | =PI()/4*Reactor!G13^2*Reactor!G14* | lb/leg | Cat $d_{50} =$ | 100 |
| 6 | Initial leg liquid = | =B5/(Reactor!G9/100)-B5 | lb/leg | $m_{liq}$ (assume all i-C4) = | =EXP(-7.3981+2562.6/(172.23+Reactor!G18+273.15)) |
| 7 | | | | PE $d_{50} =$ | =0.42*"Sett Leg (calcs)!F4"("Sett Leg (calcs)!F3/Reactor |
| 8 | Initial leg ethylene = | =B6*Reactor!G5/100 | lb/leg | $V_t =$ (Dallavalle eq.) | =(((F6^3*Reactor!G26*32.2*(Reactor!G15-Reactor!G26)/F |
| 9 | Initial leg catalyst = | =B5/Reactor!G17 | lb/leg | Settling Solids = (Dallavalle eq.) | =Reactor!G11*F7*PI()/4*Reactor!G21/100*Reactor!G13^2 |
| 10 | Bed solids = | =B4*Reactor!G10/3600/Reactor!G11 | lb/leg | # of Settling Legs | |
| 11 | Bed height = | =B9*453.59237/Reactor!G16/2.54^3/( | ft | | |
| 12 | Bed Height velocity = | =B10/Reactor!G10 | ft/s | | |
| 13 | PE out/cycle = | =Reactor!G6*Reactor!G10/3600/Reac | lb/leg/cycle | | |
| 14 | Leg drop/cycle = | =B10+(B12-B9)/(Reactor!G9/100)*45 | ft | | |
| 15 | Above bed solids = | =(Reactor!G14-"Sett Leg (calcs)!B10) | lb/leg | | |
| 16 | Loop solids = | =((B12-B9-B14)>0)*(B12-B9-B14)+((E | lb/leg/cycle | | |
| 17 | Leg solids = | =B12-B15 | lb/leg/cycle | | |

| | G | H | I | J | K | L | M | N | O |
|---|---|---|---|---|---|---|---|---|---|
| 1 | | | | | | | | | |
| 2 | | | | | | | | | |
| 3 | g/cc | | Cr (SiO₂) = 2.2, ZN (N | | | | | | |
| 4 | microns | 100=basis:90 (estimated on 969 | | | | | | | |
| 5 | cP | | | | | | | | |
| 6 | microns | | | | | | | | |
| 7 | ft/s | | | | | | | | |
| 8 | lb/h | | | | | | | | |

APPENDIX C

[Screenshot of Microsoft Excel - Rx Model Iterative spreadsheet]

Cell C26 = =C24-G28-G29

Feeds to Loop

| | | |
|---|---|---|
| Cat feed factor = | 250 | lbPE/h/min-%eth |
| Cat activity factor = | | (micron)^3*lbPE/Mwt/bcat/%eth/min |
| Catalyst/ethylene = | =C10/C11*1000 | lb/Mlb |
| Hexene/ethylene = | =C9/C11*1000 | lb/Mlb |
| Hexene = | | lb/h |
| Catalyst = | ='Cat Data'!D4/'Cat Data'!b/h | |
| Total ethylene = | | lb/h |
| Isobutane/ethylene = | =C13/C11 | ratio |
| Total Isobutene = | | lb/h |

Flash Tank

| | | |
|---|---|---|
| % Hex/%Eth = | =C18/C17/3 | mol/mol |
| % Ethylene = | | wt% |
| % Hexene = | | wt% |
| Total Feed = | =C9+C11+C13 | lb/h |
| Liquid (Vapor) = | =C21/(100-C17-C18)*1C | lb/h |
| Isobutane = | C13 | lb/h |
| Ethylene = | =C17/100*C20 | lb/h |
| Hexene = | 0.2897*C9 | lb/h |
| PE = | =C11-C22+C9-C23 | lb/h |

| | | |
|---|---|---|
| PE Balance = | =C24-G28-G29 | lb/h |
| Hexene Bal = | =C18/100*C20-C23 | lb/h |
| Settling Solids Bal = | ='Sett Leg (calcs)'!B4-'S | lb/h |

Inside Loop

Hydrogen

Inside Loop

| | | |
|---|---|---|
| % Eth in loop = | =C17 | wt% in liq |
| PE (Heat Bal) = | =G17*C10 | lb/h |
| Temp = | 210 | F |
| Press = | 600 | psig |
| % Solids = | 37.8861061352257 | wt% |
| $t_{cate}$ = | =G11/8*350/330 | s |
| # of Settling Legs = | 4 | |
| Loop Volume = | 100 | m³ |
| Settling Leg Diam. = | 10 | inches |
| Settling Leg Height = | 15 | ft |
| $r_{FE}$ = | 0.89 | g/cc |
| $BD_{FE}$ = | 0.45 | g/cc |
| Catalyst Productivity = | =G25*G23*G5 | lb PE/lb cat |
| Temp = | =(G7-32)*5/9 | C |
| Press = | =(G8+14.69595)*0.06804596 | atm |
| $r_{swp}$ = | =100*G15*G26/(100*G15+G9*G2 | g/cc |
| % Solids = | =G9*Reactor!G15/(G9*Reactor!G | vol% |
| % C6 = | =C18 | wt% in liq |
| Solids R.T. = | =G12*G20*G9/100*1000/1000*1 | min |
| Liquid R.T. = | =G12*G20*(100-G9)/100*1000/1000*1 | min |
| k (catalyst activity) = | =Cat Date!E5 | |
| $r_{rxn}$ = | =0.5787+0.0002273*G19-G5*(0.1 | g/cc |
| Settling Solids = | =(C19-100*G9)*C24)/(G16+(1-G1 | lb/h |
| PE from legs = | ='Sett Leg (calcs)'!B16*G11*G10* | lb/h |
| PE from loop = | ='Sett Leg (calcs)'!B15*G11*G10* | lb/h |
| Total out = | =C24*453.6/G15/3785.4/60+C20* | gpm |

Hydrogen

| | | |
|---|---|---|
| Hydrogen Feed = | 0 | lb/h |
| Hydrogen Out = | =0.5*G34 | lb/h |
| % Hydrogen = | =G35/C20*100 | wt% |
| %Hydrogen = | =G36*58.12/2 | mol% |
| % Hy/% Eth = | =G37/(C17*58.12/28.05) | mol/mol |

Catalyst Kinetic Data

| | A | B | C | D | E |
|---|---|---|---|---|---|
| 1 | Catalyst Kinetic Data | | | | |
| 5 | Cat. Act. | =D5*1000000/Sett Leg (calcs)!F4*3 | lb/lb/min/%eth | =ReactorlC5 | lbPE/h/%eth/minRT |
| 6 | | | | =ReactorlC6 | lbPE/MMlbcat/min/% |

Settling Leg Effects

| | A | B | C |
|---|---|---|---|
| 1 | Settling Leg Effects | | |
| 2 | | | |
| 3 | V$_t$ = | | |
| | (Mass balance) = | =B4/Reactor!G21*PI()*4/Reactor!G21*100/Reactor!G13^2*144/3600/Reactor!G15/62.428 | ft/s |
| 4 | Settling Solids = | | |
| | (Mass balance) = | =Reactor!G27 | lb/h |
| 5 | Initial leg solids = | | lb/leg |
| 6 | Initial leg liquid = | | lb/leg |
| 7 | | | |
| 8 | Initial leg ethylene = | | lb/leg |
| 9 | Initial leg catalyst = | | lb/leg |
| 10 | Bed solids = | =B4*Reactor!G10/3600/Reactor!G11 | lb/leg |
| 11 | Bed height = | =B9*453.59237/Reactor!G16/2.54^3/PI()/4*Reactor!G13^2)/12 | ft |
| 12 | Bed Height velocity = | =B10/Reactor!G10 | ft/s |
| 13 | PE out/cycle = | =Reactor!G6*Reactor!G10/3600/Reactor!G10 | lb/leg/cycle |
| 14 | Leg drop/cycle = | =B10+(B12-B9)/(Reactor!G9/100)*453.59237/Reactor!G20/(2.54^3)/PI()/4*Reactor!G13^2)/12 | ft |
| 15 | Above bed solids = | =(Reactor!G14-'Sett Leg (calcs)'!B10)*12*PI()/4*(Reactor!G13)^2*2.54^3*Reactor!G20/453.6*Reactor!G9/100 | lb/leg |
| 16 | Loop. solids = | =((B12-B9-B14)+D)*(B12-B9-B14)+((B12-B9-B14)<0)*0 | lb/leg/cycle |
| 17 | Leg solids = | =B12-B15 | lb/leg/cycle |

| | E | F |
|---|---|---|
| 1 | | |
| 2 | | |
| 3 | $t_{cat}$ = | 2.2 |
| 4 | Cat $d_{50}$ = | 100 |
| 5 | $m_{liq}$ (assume all i-C4) = | =EXP(-7.3981+2582.6/(172.23+Reactor!G18+273.15)) |
| 6 | PE $d_{50}$ = | =0.42*Sett Leg (calcs)!F4*(Sett Leg (calcs)!F3/Reactor!G15*Reactor!G17)^0.333 |
| 7 | $v_t$ = | (((F6^3*Reactor!G26*32.2*(Reactor!G15-Reactor!G26)/F5^2*100^2/328030000000)^0.5*1.827+14.42)^0.5-3.798)^2*F5/(F6*Reactor!G26)*3.2808 |
| 8 | (Dallavalle eq.) = | =Reactor!G26*32.2*(Reactor!G15-Reactor!G26)/F5^2*100^2/328030000000 ... |
| 9 | Settling Solids = | |
| 10 | (Dallavalle eq.) = | =Reactor!G11*F7*PI()/4*Reactor!G21/100*Reactor!G13^2/144*3600*Reactor!G15*62.428 |

Cr (SiO₂) = 2.2, ZN (MgCl₂) = 1.58

What is claimed is:

1. A process for producing polyethylene using a loop reactor comprising:
   using a mathematical model to predict a plurality of process control parameters based on desired product properties and reactor characteristics and controlling the process using the predicted process control parameters;
   wherein variables used to prepare the mathematical model include a plurality of variables selected from the group consisting of: ethylene flow into reactor, ethylene flow out of reactor, isobutane flow into reactor, isobutane flow out of reactor, hexene flow into reactor, hexene flow out of reactor, hexene conversion in reactor, hydrogen flow into reactor, hydrogen flow out of reactor, hydrogen conversion in reactor, polymer flow out of reactor, liquid flow out of reactor, total mass flow into reactor, total mass flow out of reactor, total volume flow out of reactor, catalyst flow into reactor, catalyst flow out of reactor, concentration of ethylene in the reactor liquid, concentration of hexene in the reactor liquid, concentration of hydrogen in the reactor liquid, temperature of reactor, pressure of reactor, weight concentration of solids in a reactor slurry, volume concentration of solids in a reactor slurry, weight concentration of solids in a settling leg solids bed, number of settling legs, reactor volume, settling leg diameter, settling leg height, bulk density of reactor polymer, density of reactor polymer, density of reactor liquid, density of reactor slurry, residence time of reactor solids, catalyst activity, catalyst productivity, catalyst diameter, catalyst feed factor, catalyst activity factor, terminal velocity of settling polymer, polymer settling rate, rate of polymer leaving reactor that is not part of the settling leg solids bed, rate of slurry leaving reactor that is part of the settling leg solids bed, rate of slurry leaving reactor that is not part of the settling leg solids bed, viscosity of reactor liquid, density of catalyst, polymer diameter, Archimedes number for polymer settling in settling leg, Reynolds number for polymer settling in settling leg, acceleration due to gravity, cross sectional area of a settling leg occupied by polymer, and cross sectional area of a settling leg; and
   wherein the variables used to prepare the mathematical model are: polymer flow out of the reactor, liquid flow out of the reactor, concentration of ethylene in the reactor liquid, temperature of the reactor, pressure of the reactor, weight concentration of solids in the reactor slurry, reactor volume, settling leg diameter, settling leg height, bulk density of the reactor polymer, density of the reactor polymer, and density of the catalyst.

2. A process for producing polyethylene using a loop reactor comprising:
   using a mathematical model to predict a plurality of process control parameters based on desired product properties and reactor characteristics and
   controlling the process using the predicted process control parameters;
   wherein variables used to prepare the mathematical model include a plurality of variables selected from the group consisting of: ethylene flow into reactor, ethylene flow out of reactor, isobutane flow into reactor, isobutane flow out of reactor, hexene flow into reactor, hexene flow out of reactor, hexene conversion in reactor, hydrogen flow into reactor, hydrogen flow out of reactor, hydrogen conversion in reactor, polymer flow out of reactor, liquid flow out of reactor, total mass flow into reactor, total mass flow out of reactor, total volume flow out of reactor, catalyst flow into reactor, catalyst flow out of reactor, concentration of ethylene in the reactor liquid, concentration of hexene in the reactor liquid, concentration of hydrogen in the reactor liquid, temperature of reactor, pressure of reactor, weight concentration of solids in a reactor slurry, volume concentration of solids in a reactor slurry, weight concentration of solids in the settling leg solids bed, number of settling legs, reactor volume, settling leg diameter, settling leg height, bulk density of reactor polymer, density of reactor polymer, density of reactor liquid, density of reactor slurry, residence time of reactor solids, catalyst activity, catalyst productivity, catalyst diameter, catalyst feed factor, catalyst activity factor, terminal velocity of settling polymer, polymer settling rate, rate of polymer leaving reactor that is not part of the settling leg solids bed, rate of slurry leaving reactor that is part of the settling leg solids bed, rate of slurry leaving reactor that is not part of the settling leg solids bed, viscosity of reactor liquid, density of catalyst, polymer diameter, Archimedes number for polymer settling in settling leg, Reynolds number for polymer settling in settling leg, acceleration due to gravity, cross sectional area of a settling leg occupied by polymer, and cross sectional area of a settling leg; and
   wherein the variables used to prepare the mathematical model are: polymer flow out of the reactor, liquid flow out of the reactor, concentration of ethylene in the reactor liquid, temperature of the reactor, pressure of the reactor, weight concentration of solids in the reactor slurry, reactor volume, settling leg diameter, settling leg height, bulk density of the reactor polymer, density of the reactor polymer, density of the catalyst, concentration of hexene in the reactor liquid, concentration of hydrogen in the reactor liquid, hexene conversion in the reactor, and hydrogen conversion in the reactor.

3. A process for designing a configuration of a loop reactor used to produce polymers comprising:
   using a mathematical model to predict a plurality of process control parameters based on desired product properties and reactor characteristics and controlling the process using the predicted process control parameters, where variables used to prepare the mathematical model are selected from the group consisting of: mass balance of the reactor contents, reactor geometry, catalyst kinetics, and settling phenomena in an outlet settling leg, which is used to determine relationships between inlet feed rates and reactor geometry on production conditions; and
   wherein variability is decreased by 70% in comparison to a conventional PID controller.

4. The process of claim 1, wherein the model is displayed in a spreadsheet.

5. The process of claim 2, wherein the model is displayed in a spreadsheet.

6. The process of claim 1, further comprising the steps of:
   using sensors in the reactor to provide inputs to a PID controller;
   using another controller to receive data from said PID controller; and
   reprogramming the PID controller with the other controller, based upon the inputs from the reactor sensors.

7. The process of claim 6, wherein a plurality of PID controllers are used to receive inputs from the reactor sensors, and wherein the PID controllers are reprogrammed based upon the inputs from the reactor sensors and the other PID controllers.

8. The process of claim 1, wherein said mathematical model is incorporated into logic circuits of a controller.

9. The process of claim 2, wherein said mathematical model is incorporated into logic circuits of a controller.

10. The process of claim 1, wherein said mathematical model is created with a Fortran or C++ computer program.

11. The process of claim 2, wherein said mathematical model is created with a Fortran or C++ computer program.

12. A process for producing polyethylene using a loop reactor comprising:

using a mathematical model to predict a plurality of process control parameters based on desired product properties and reactor characteristics and controlling the process using predicted and actual process control parameters;

wherein the mathematical model includes settling leg data and a plurality of variables selected from the group consisting of:

| | |
|---|---|
| $E_i =$ | ethylene flow into the reactor, |
| $E_o =$ | ethylene flow out of the reactor, |
| $I_i =$ | isobutane flow into the reactor, |
| $I_o =$ | isobutane flow out of the reactor, |
| $H_i =$ | hexene flow into the reactor, |
| $H_o =$ | hexene flow out of the reactor, |
| $H_c =$ | hexene conversion in the reactor, |
| $h_i =$ | hydrogen flow into the reactor, |
| $h_o =$ | hydrogen flow out of the reactor, |
| $h_c =$ | hydrogen conversion in the reactor, |
| $P_o =$ | polymer flow out of the reactor, |
| $L_o =$ | liquid flow out of the reactor, |
| $T_{iw} =$ | total mass flow into the reactor, |
| $T_{ow} =$ | total mass flow out of the reactor, |
| $T_{ov} =$ | total volume flow out of the reactor, |
| $c_i =$ | catalyst flow into the reactor, |
| $c_o =$ | catalyst flow out of the reactor, |
| $C_E =$ | concentration of ethylene in a reactor liquid, |
| $C_H =$ | concentration of hexene in a reactor liquid, |
| $C_h =$ | concentration of hydrogen in a reactor liquid, |
| $T =$ | temperature of the reactor, |
| $P =$ | pressure of the reactor, |
| $S_w =$ | weight concentration of solids in a reactor slurry, |
| $S_v =$ | volume concentration of solids in a reactor slurry, |
| $S_{ws} =$ | weight concentration of solids in a settling leg solids bed, |
| $N_l =$ | number of settling legs, |
| $V =$ | reactor volume, |
| $d_l =$ | settling leg diameter, |
| $h_l =$ | settling leg height, |
| $r_b =$ | bulk density of a reactor polymer, |
| $r_p =$ | density of a reactor polymer, |
| $r_l =$ | density of a reactor liquid, |
| $r_s =$ | density of a reactor slurry, |
| $t_s =$ | residence time of reactor solids, |
| $k =$ | catalyst activity, |
| $p =$ | catalyst productivity, |
| $d_o =$ | catalyst diameter, |
| $f_c =$ | catalyst feed factor, |
| $k_c =$ | catalyst activity factor, |
| $v_t =$ | terminal velocity of a settling polymer, |
| $P_s =$ | polymer settling rate, |
| $P_n =$ | rate of a polymer leaving the reactor that is not part of the settling leg solids bed, |
| $T_s =$ | rate of the slurry leaving the reactor that is part of the settling leg solids bed, |
| $T_n =$ | rate of the slurry leaving the reactor that is not part of the settling leg solids bed, |
| $m_l =$ | viscosity of the reactor liquid, |
| $r_c =$ | density of the catalyst, |
| $d_p =$ | polymer diameter, |
| $N_{Ar} =$ | Archimedes number for polymer settling in a settling leg, |
| $N_{Re} =$ | Reynolds number for polymer settling in a settling leg, |
| $g =$ | acceleration due to gravity, |
| $A_{lp} =$ | cross sectional area of a settling leg occupied by the polymer; and |
| $A_l =$ | cross sectional area of a settling leg. |

13. The process of claim 12, wherein the mathematical model includes formulas selected from the group consisting of:

mass balance of a reactor, determined by:

$$T_{iw} - (L_o + P_o) = 0, \text{ where:}$$

$P_o$ is polymer flow out of the reactor, $L_o$ is liquid flow out of the reactor, and $T_{iw}$ is total mass flow into the reactor;

mass flows in an outlet liquid based upon outlet concentrations and hydrogen flow, determined by:

$$E_o = \frac{L_o C_E}{100}, H_o = \frac{L_o C_H}{100}, h_o = \frac{L_o C_h}{100}, I_o + E_o + H_o = L_o, \text{ and}$$

$$I_o = L_o - E_o - H_o, \text{ where:}$$

$E_o$ is ethylene flow out of the reactor, $L_o$ is liquid flow out of the reactor, $C_e$ is concentration of ethylene in the reactor liquid, $H_o$ is hexene flow out of the reactor, $C_H$ is concentration of hexene in the reactor liquid, $C_h$ is concentration of hydrogen in the reactor liquid, $h_o$ is hydrogen flow out of the reactor, $I_o$ is isobutane flow out of the reactor, and where $h_o$ that is a smallest portion of total liquid flow;

an assumed mass balance of isobutane around the reactor, determined by:

$$I_i - I_o = 0, \text{ where:}$$

$I_i$ is isobutane flow into the reactor, and $I_o$ is isobutane flow out of the reactor;

hexene and hydrogen feeds into the reactor, determined by:

$$H_o = \frac{H_i(100 - C_H)}{100}, H_i = \frac{100 H_o}{100 - C_H}, h_o = \frac{h_i(100 - C_h)}{100}, \text{ and}$$

$$h_o = \frac{h_i(100 - C_h)}{100}, \text{ where:}$$

$H_i$ is hexene flow into the reactor, $H_o$ is hexene flow out of the reactor, and $C_H$ is concentration of hexene in the reactor liquid, wherein a constant conversion of hexene and hydrogen into polymer across an intended operating region is assumed;

catalyst flow into the reactor, calculated using catalyst productivity and catalyst mass balance around the reactor, by:

$$p = \frac{P_o}{c_o} \text{ and } c_i - c_o = 0,$$

where:

p is catalyst productivity, $P_o$ is polymer flow out of the reactor, $c_i$ is catalyst flow into the reactor, and $c_o$ is catalyst flow out of the reactor;

slurry density, calculated using liquid density, an assumed polymer density, and a solids concentration, determined by:

$$p_s = \frac{100\rho_p\rho_l}{100\rho_p + S_W(\rho_l - \rho_p)};$$

volumetric flow rate of slurry out of the reactor determined from mass flow rate and density of each component, determined by:

$$T_{ov} = \frac{P_o}{\rho_p} + \frac{L_o}{\rho_l}$$

volumetric solids concentration in the reactor, determined by:

$$S_v = \frac{100}{1 + \frac{\rho_p}{\rho_l}\left(\frac{100}{S_w} - 1\right)};$$

solid residence time, determined by:

$$\tau_s = \frac{V\rho_s S_W}{100 P_O};$$

catalyst activity, determined by:

$$p = \frac{P_o}{C_o} \text{ and } k = \frac{p}{\tau_s C_E};$$

a catalyst feed factor, determined by:

$f_c = kc_i$;

a catalyst feed factor, using a mass balance of catalyst around the reactor, determined by:

$$f_c = kc_i - kc_o = \frac{P_o}{\tau_s C_E};$$

a catalyst activity factor that quantifies reactivity of a catalyst with respect to the catalyst size, by:

$$k_c = \frac{k}{d_c^3};$$

concentration of a polymer in a settling bed as a function of the polymer, liquid densities, and polymer bulk density, determined by:

$$S_{ws} = \frac{100}{1 + \rho_l\left(\frac{1}{\rho_b} - \frac{1}{\rho_p}\right)};$$

mass balance of two portions of an outlet slurry, determined by:

$T_{ow} = T_s + T_n;$ mass balance of two portions of a polymer in outlet slurry, determined by:

$P_o = P_s + P_n;$ an amount of polymer leaving a settling leg from the settled bed of polymer, calculated using known polymer concentrations of two polymer portions, by:

$$T_s = \frac{100 P_s}{S_{ws}}, T_n = \frac{100 P_n}{S_w}, T_{ow} = \frac{100 P_s}{S_{ws}} + \frac{100 P_n}{S_w},$$

$$T_{ow} = \frac{100 P_s}{S_{ws}} + \frac{100(P_o - P_s)}{S_w}, \text{ and } P_s = \frac{\frac{T_{ow}}{100} - \frac{P_o}{S_w}}{\frac{1}{S_{ws}} - \frac{1}{S_w}}, \text{ where:}$$

$T_s$ is the rate of slurry leaving the reactor that is part of the settling leg solids bed, $T_n$ is the rate of slurry leaving reactor that is not part of the settling leg solids bed, $T_{ow}$ is the total mass flow out of reactor, and wherein the flow rate indicates polymer settling rate in the settling leg;

viscosity of isobutane liquid as a function of temperature, determined by:

$$\mu_l(cP) = e^{-7.3891 + \frac{2582.6}{172.23 + T(K)}};$$

polymer diameter, determined by:

$$d_p = 0.42 d_c \left(\frac{\rho_c p}{\rho_p}\right)^{1/3};$$

Archimedes number for polymer settling through the isobutane liquid, determined by:

$$N_{Ar} = \frac{d^3 \rho_l g (\rho_p - \rho_l)}{\mu_l^2} \text{ and } N_{Ar} = 1.13e05;$$

calculation of a Reynolds number from the Archimedes number, by:

$$N_{Re} = \left(\sqrt{14.42 + 1.827\sqrt{N_{Ar}}} - 3.798\right)^2,$$

then determining a velocity of a settling polymer, using:

$$N_{Re} = \frac{d_p v_t \rho_l}{\mu_l} \text{ and } v_t = \frac{N_{Re}\mu_l}{d_p \rho_l};$$

a mass flow of settling solids as related to a velocity of said solids, determined by:

$P_s = N_l A_{lp} v_t \rho_p;$ an area of a settling leg occupied by polymer, determined by:

$$A_{lp} = \frac{A_l S_v}{100} = \frac{\pi}{400} d_l^2 S_v,$$

then substituting said area of the settling leg into the mass flow of settling solids, determined by:

$$P_s = \frac{\pi}{400} N_l d_l^2 S_v v_r \rho_p;$$

and wherein a number of settling legs required for reactor geometry and production conditions, is determined by:

$$N_l = \frac{400 P_s}{\pi d_l^2 S_v v_t \rho_p}.$$

14. The process of claim 12, wherein it is assumed that HDPE is produced from monomers consisting of ethylene and hexene, and where ethylene feed into the reactor is calculated from a mass balance of ethylene around the reactor, using:

$$E_i\{E_o + [P_o - (H_i - H_o)]\} = 0 \text{ or } E_i = E_o + [P_o - (H_i - H_o)],$$

where:

$E_i$ is ethylene flow into the reactor,
$E_o$ is ethylene flow out of the reactor,
$P_o$ is polymer flow out of the reactor,
$H_i$ is hexene flow into the reactor, and
$H_o$ is hexene flow out of the reactor.

15. The process of claim 12, wherein it is assumed that HDPE is produced from monomers and where HDPE production kinetics are assumed to be first-order for ethylene concentration in a liquid and catalyst flow rate, wherein kinetic rate is determined by:

$$P_o = k c_o C_E \tau_S.$$

16. The process of claim 13, where catalyst activity is determined by:

$$p = \frac{P_o}{c_o}; \text{ and}$$

$$k = \frac{p}{\tau_s C_E} = \frac{1624.9 \text{ lb/lb}}{(45.9 \text{ min})(5.0537 \text{ wt \%})} = 7.00 \text{ lb/lb/min/wt \%};$$

where catalyst feed factor is a function of other measured reactor variables, making it independent of catalyst type or catalyst activity, expressed by:

$$f_c = k c_i, \text{ then}$$

using mass balance of a catalyst around the reactor and a rearranged kinetic rate equation to determine catalyst feed factor, by:

$$f_c = k c_i = k d_o = \frac{P_o}{\tau_s C_E} = \frac{58034 \text{ lb/h}}{(45.9 \text{ min})(5.0537 \text{ wt \%})} = 250 \text{ lb/h/min/wt \%},$$

where a catalyst activity factor quantifies reactivity of a specific catalyst with respect to its size, expressed as:

$$k_c = \frac{k}{d_c^3} = \frac{7.00 \text{ lb/lb/min/wt \%}}{(100\mu)^3} \cdot \frac{1e016 \text{ lb}}{1 \text{ MMlb}} = 7.00 \text{ lb/MMlb/min/wt \%}/\mu^3,$$

where $\mu^3$ is expressed in microns.

\* \* \* \* \*